(12) United States Patent
Hino et al.

(10) Patent No.: US 11,680,194 B2
(45) Date of Patent: Jun. 20, 2023

(54) METHOD FOR PRODUCING SILICONE-BASED ADHESIVE

(71) Applicant: DOW TORAY CO., LTD., Tokyo (JP)

(72) Inventors: Takakazu Hino, Ichihara (JP); Michitaka Suto, Ichihara (JP); Akihiro Nakamura, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 792 days.

(21) Appl. No.: 16/606,556

(22) PCT Filed: Apr. 13, 2018

(86) PCT No.: PCT/JP2018/015462
§ 371 (c)(1),
(2) Date: Oct. 18, 2019

(87) PCT Pub. No.: WO2018/193973
PCT Pub. Date: Oct. 25, 2018

(65) Prior Publication Data
US 2020/0392383 A1 Dec. 17, 2020

(30) Foreign Application Priority Data

Apr. 20, 2017 (JP) .............................. JP2017-083941

(51) Int. Cl.
| C09J 183/04 | (2006.01) |
| C09J 7/25 | (2018.01) |
| C08G 77/08 | (2006.01) |
| C08G 77/12 | (2006.01) |
| C08G 77/20 | (2006.01) |

(52) U.S. Cl.
CPC ............ *C09J 183/04* (2013.01); *C08G 77/08* (2013.01); *C08G 77/12* (2013.01); *C08G 77/20* (2013.01); *C09J 7/255* (2018.01); *C09J 2203/318* (2013.01); *C09J 2301/122* (2020.08); *C09J 2301/208* (2020.08); *C09J 2467/005* (2013.01); *C09J 2483/00* (2013.01)

(58) Field of Classification Search
CPC ................ C09J 183/04; C09J 2301/208; C09J 2467/005
See application file for complete search history.

(56) References Cited

U.S. PATENT DOCUMENTS

| 5,961,770 | A | 10/1999 | Cifuentes et al. |
| 7,488,539 | B2 | 2/2009 | Kozakai et al. |
| 7,833,577 | B2 | 11/2010 | Sheridan et al. |
| 9,260,632 | B2 | 2/2016 | Goeb et al. |
| 2014/0194019 | A1* | 7/2014 | Greer .................... C09J 183/06 428/221 |

FOREIGN PATENT DOCUMENTS

| CN | 101678653 | A | 3/2010 |
| CN | 104685013 | A | 6/2015 |
| JP | 2002047473 | A | 2/2002 |
| JP | 2005060549 | A | 3/2005 |
| JP | 2007138149 | A | 6/2007 |
| JP | 2010143976 | A | 7/2010 |
| JP | 2010526931 | A | 8/2010 |
| JP | 2012062373 | A | 3/2012 |
| JP | 2014198787 | A | 10/2014 |
| JP | 2015091948 | A | 5/2015 |
| JP | 2015151418 | A | 8/2015 |
| JP | 2015214703 | A | 12/2015 |
| WO | 2008141001 | A1 | 11/2008 |
| WO | 2014058076 | A1 | 4/2014 |
| WO | 2016106040 | A1 | 6/2016 |

OTHER PUBLICATIONS

English translation of International Search Report for PCT/JP2018/015462 dated Jul. 3, 2018, 2 pages.
Machine assisted English translation of JP2010143976A obtained from https://patents.google.com on Oct. 16, 2019, 9 pages.
Machine assisted English translation of JP2012062373A obtained from https://patents.google.com on Oct. 16, 2019, 11 pages.
Machine assisted English translation of JP2014198787A obtained from https://patents.google.com on Oct. 16, 2019, 12 pages.
Machine assisted English translation of JP2015151418A obtained from https://patents.google.com on Oct. 16, 2019, 16 pages.
Machine assisted English translation of JP2002047473A obtained from https://patents.google.com/patent on Feb. 9, 2023, 8 pages.
Machine assisted English translation of JP2005060549A obtained from https://patents.google.com/patent on Feb. 9, 2023, 8 pages.
Machine assisted English translation of JP2015091948A obtained from https://patents.google.com/patent on Feb. 9, 2023, 14 pages.
Machine assisted English translation of JP2015214703A obtained from https://patents.google.com/patent on Feb. 9, 2023, 13 pages.

* cited by examiner

*Primary Examiner* — Pancham Bakshi
(74) *Attorney, Agent, or Firm* — Warner Norcross + Judd LLP

(57) ABSTRACT

A method for producing a silicone-based adhesive is disclosed. The method comprises: (1) applying a silicone composition (I) to one surface of a peelable substrate, and then forming a silicone layer (I) by curing or drying the silicone composition (I); and (2) applying a silicone composition (II) to a surface of the silicone layer (I), and then forming the silicone-based adhesive by curing the silicone composition (II). The silicone composition (I) contains a silicone resin. The silicone composition (II) either does not contain the silicone resin or if contained, its content amount is lower than that in the silicone composition (I). The method is useful for producing a silicone-based adhesive with low peel resistance from a peelable substrate even with a low modulus.

16 Claims, 1 Drawing Sheet

METHOD FOR PRODUCING SILICONE-BASED ADHESIVE

CROSS-REFERENCE TO RELATED APPLICATIONS

This application is the National Stage of International Application No. PCT/JP2018/015462 filed on 13 Apr. 2018, which claims priority to and all advantages of Japanese Patent Appl. No. 2017-083941 filed on 20 Apr. 2017, the content of which is hereby incorporated by reference.

TECHNICAL FIELD

The present invention is related to a method for producing a silicone-based adhesive.

BACKGROUND ART

Silicone-based adhesives have superior adhesiveness and cohesiveness and in addition, superior thermal resistance, electrical characteristics, low-temperature characteristics, and water resistance, and therefore are used in a variety of applications. In recent years, adhesives with no support structure have been investigated for applications such as for flexible displays and there is demand for an adhesive with a low modulus. However, if the modulus of silicone-based adhesive is reduced, peel resistance relative to a peelable substrate increases and this generates a restriction that expensive peelable substrates such as fluorine-based resins have to be used. Furthermore, with silicone-based adhesives, if the modulus is reduced at low temperature, even on a peelable substrate such as a fluorine-based resin, the silicone-based adhesive does not peel off smoothly and generates an unpleasant tearing sound. In other words there is a problem where a phenomenon called zipping or stick-slip occurs.

On the other hand, Patent Document 1 proposes a method for producing a multi-layer tensile peelable adhesive, the method comprising: forming a first silicone-based adhesive layer on a surface of a peelable substrate, and then forming a layer of a composition containing an elastomer on the surface of the adhesive layer. With this multi-layer tensile peelable adhesive, the composition layer containing an elastomer must have sufficient tensile strength. In Patent Document 1, the lowering of the modulus of the silicone-based adhesive is irrelevant.

PRIOR ART DOCUMENTS

Patent Documents

Patent Document 1: JP 2010-526931(A)

SUMMARY OF THE INVENTION

Problems to be Solved by the Invention

An objective of the present invention is to provide a method for producing a silicone-based adhesive with low peel resistance from a peelable substrate even though modulus is low.

Means for Solving the Problems

The present invention is a method for producing a silicone-based adhesive, the method comprising the following steps (1) to (2):

step (1): applying a silicone composition (I) to one surface of a peelable substrate, and then forming a silicone layer (I) by curing or drying the silicone composition (I);
step (2): applying a silicone composition (II) to the surface of the silicone layer (I), and then forming the silicone-based adhesive by curing the silicone composition (II),
wherein the silicone composition (I) contains a silicone resin comprising: a siloxane unit represented by the formula: $R_3SiO_{1/2}$ (where each R represents the same or different monovalent hydrocarbon group with 1 to 12 carbon atoms) and a siloxane unit represented by the formula: $SiO_{4/2}$, and the silicone composition (II) either does not contain the silicone resin or if contained, its content amount is less than that in the silicone composition (I).

The silicone composition (I) is preferably at least one type selected from a group consisting of (i) to (iii) described below.

(i) a silicone composition comprising: (a) a silicone resin comprising: a siloxane unit represented by the formula: $R_3SiO_{1/2}$ (where each R represents the same or different monovalent hydrocarbon group with 1 to 12 carbon atoms) and a siloxane unit represented by the formula: $SiO_{4/2}$, and (b) a diorganopolysiloxane;
(ii) a silicone composition comprising: component (a) mentioned above, component (b) mentioned above, and a partially cross-linked material of components (a) and (b) mentioned above;
(iii) a silicone composition comprising: component (a) mentioned above, (c) an organopolysiloxane having at least two alkenyl groups in a molecule, (d) an organohydrogenpolysiloxane having at least two silicon atom-bonded hydrogen atoms in a molecule, and (e) a hydrosilylation reaction catalyst.

The silicone composition (I) preferably contains at least 50 mass % of component (a) mentioned above, and the silicone composition (II) preferably either does not contain component (a) mentioned above, or if contained, its content amount is lower than that in the silicone composition (I).

The silicone composition (II) preferably comprises: (c') an organopolysiloxane having at least two alkenyl groups in a molecule, (d') an organohydrogenpolysiloxane having at least two silicon atom-bonded hydrogen atoms in a molecule, and (e') a hydrosilylation reaction catalyst.

A shear storage modulus at 25° C. of the silicone formed by curing or drying the silicone composition (I) is preferably larger than a shear storage modulus at 25° C. of the silicone cured product obtained by curing only the silicone composition (II).

After the step (2), the following step (3) is preferably comprised:
Step (3): adhering a substrate to the surface of the silicone-based adhesive, and the substrate is preferably a peelable substrate.

Effects of the Invention

The method of the present invention is an enabling method for producing a silicone-based adhesive with low peel resistance from a peelable substrate even with a low modulus.

MODE FOR CARRYING OUT THE INVENTION

Figure 1:
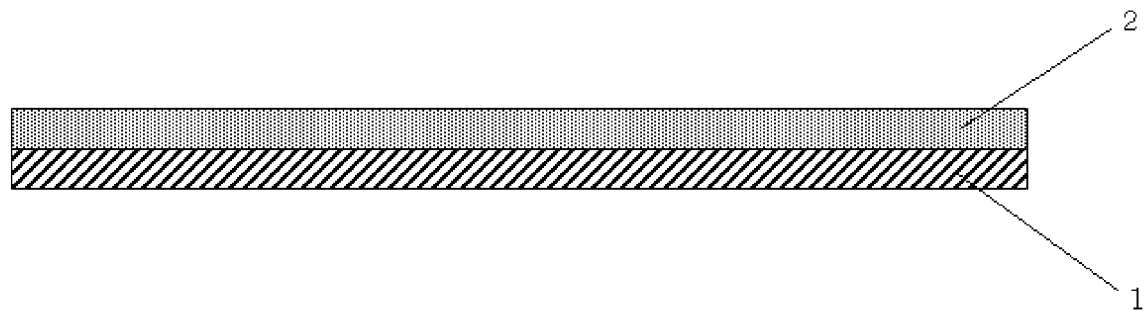
FIG. 1 is a cross section drawing showing a state of forming a silicone layer (I) on a peelable substrate in the method of the present invention.
Figure 2:
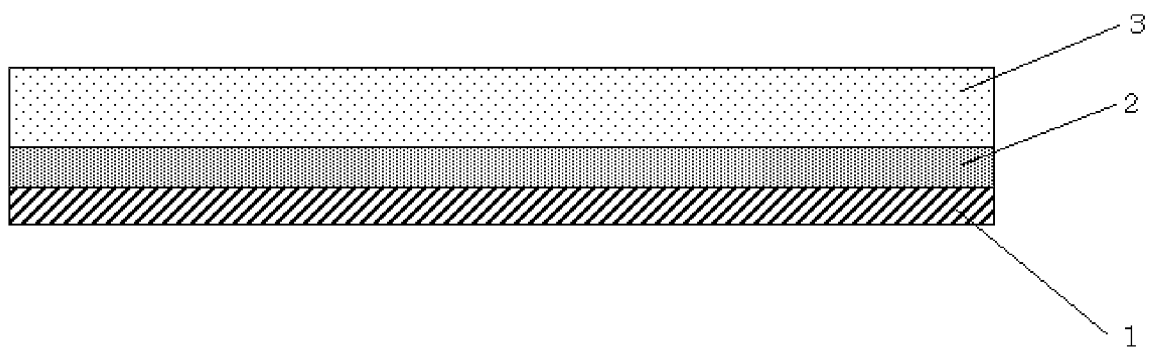
FIG. 2 is a cross section drawing showing the state just after applying a silicone composition (II) to the surface of the silicone layer (I) in the method of the present invention.
Figure 3:
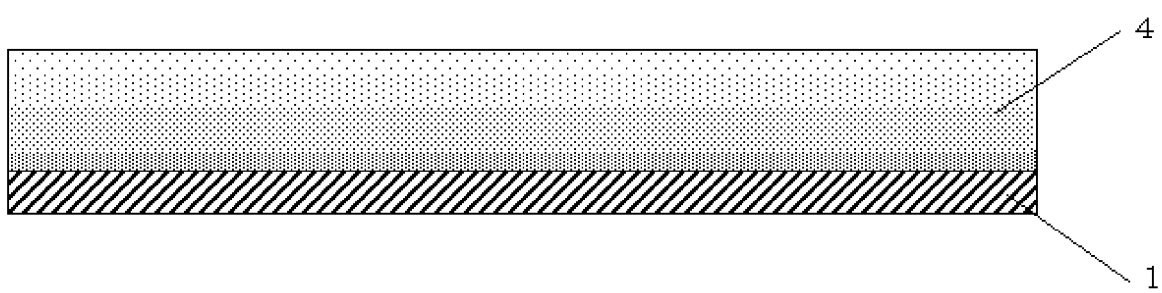
FIG. 3 is a cross section drawing showing the state of forming a silicone-based adhesive on one side of a peelable substrate in the method of the present invention.
Figure 4:
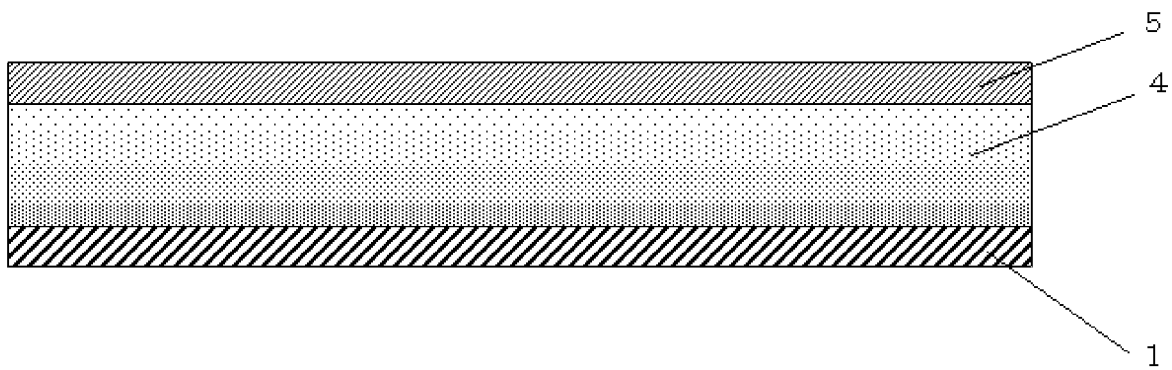
FIG. 4 is a cross section drawing showing a state of adhering a substrate to the surface of the silicone-based adhesive in the method of the present invention.

With the present method, in the step (1), a silicone composition (I) is applied to one surface of a peelable substrate and a silicone layer (I) is formed by curing or drying the silicone composition (I).

There are no restrictions for the peelable substrate and examples include films surface-treated with a fluorosilicone, such as polyethylene, polypropylene, polystyrene, polyvinyl chloride, polycarbonate, polyethylene terephthalate (PET), nylon, thermoplastic polyurethane, or the like; fluorine-based resin films such as polytetrafluoroethylene or the like; films covered with a fluorine-based resin such as polytetrafluoroethylene, such as polyethylene, polypropylene, polystyrene, polyvinyl chloride, polycarbonate, polyethylene terephthalate, nylon, thermoplastic polyurethane, or the like. Among them, a polyethylene terephthalate film surface-treated with a fluorosilicone is preferable.

In addition, the silicone composition (I) contains a silicone resin comprising: a siloxane unit represented by the formula: $R_3SiO_{1/2}$ and a siloxane unit represented by the formula: $SiO_{4/2}$. In the formula, each R represents the same or different monovalent hydrocarbon group with 1 to 12 carbon atoms. Examples of the monovalent hydrocarbon groups include alkyl groups with 1 to 12 carbon atoms such as methyl groups, ethyl groups, propyl groups, butyl groups, pentyl groups, heptyl groups, and the like; alkenyl groups with 2 to 12 carbon atoms such as vinyl groups, allyl groups, butenyl groups, pentenyl groups, and the like; aryl groups with 6 to 12 carbon atoms such as phenyl groups, tolyl groups, xylyl groups, and the like; aralkyl groups with 7 to 12 carbon atoms such as benzyl groups, phenethyl groups, and the like; halogen-substituted alkyl groups with 1 to 12 carbon atoms such as chloromethyl groups, 3-chloropropyl groups, 3,3,3-trifluoropropyl groups, and the like, and methyl groups, vinyl groups, and phenyl groups are preferable.

The silicone resin is one type of silicone resin or two or more types of silicone resin comprising: a siloxane unit represented by the formula: $R_3SiO_{1/2}$ and a siloxane unit represented by the formula: $SiO_{4/2}$. In the silicone resin, a mole ratio of the siloxane unit represented by the formula: $R_3SiO_{1/2}$ relative to a siloxane unit represented by the formula: $SiO_{4/2}$ is not restricted, but is preferably in a range of 0.6 to 2.0, in a range 0.6 to 1.5, in a range 0.6 to 1.1, or in a range 0.7 to 1.0. This is because, if the mole ratio is above the lower limit of the range described above, the silicone layer (I) obtained is provided with favorable flexibility while on the other hand, if below the upper limit of the range described above, the silicone layer (I) obtained is provided with favorable stickiness.

The silicone resin can contain a siloxane unit represented by the formula: $R_2SiO_{2/2}$ and a siloxane unit represented by the formula: $RSiO_{3/2}$ within a range that the objective of the present invention is not lost. In the formula, each R represents the same or different monovalent hydrocarbon groups with 1 to 12 carbon atoms and examples are the same as described above. In addition, in the silicone resin, hydrogen atoms; alkoxy groups such as methoxy groups and ethoxy groups; and hydroxyl groups can be bonded to the silicon atoms in the molecule as long as the objective of the present invention is not lost.

This type of the silicone composition (I) is preferably at least one type selected from a group consisting of (i) to (iii) described below.

(i) a silicone composition comprising: (a) a silicone resin comprising: a siloxane unit represented by the formula: $R_3SiO_{1/2}$ (where each R represents the same or different monovalent hydrocarbon groups with 1 to 12 carbon atoms) and a siloxane unit represented by the formula: $SiO_{4/2}$, and (b) a diorganopolysiloxane;

(ii) a silicone composition comprising: component (a) mentioned above, component (b) mentioned above, and a partially cross-linked material of components (a) and (b) mentioned above;

(iii) a silicone composition comprising: component (a) mentioned above, (c) an organopolysiloxane having at least two alkenyl groups in a molecule, (d) an organohydrogenpolysiloxane having at least two silicon atom-bonded hydrogen atoms in a molecule, and (e) a hydrosilylation reaction catalyst.

Component (a) is a silicone resin comprising: a siloxane unit represented by the formula: $R_3SiO_{1/2}$ and a siloxane unit represented by the formula: $SiO_{4/2}$ and is as described above.

Component (b) is a diorganopolysiloxane and essentially has a linear molecular structure but a small part of the molecular chain can be branched. Component (b) is a single type of diorganopolysiloxane or a mixture of two or more diorganopolysiloxanes with this type of molecular structure. Examples of groups bonded to the silicon atoms in component (b) include monovalent hydrocarbon groups with 1 to 12 carbon atoms as the same as described above and methyl groups, vinyl groups, and phenyl groups are preferable. In addition the silicon atoms in component (b) can have alkoxy groups such as methoxy groups, ethoxy groups, and propoxy groups; or hydroxyl groups or the like as long as the objective of the present invention is not lost.

State of this type of component (b) at 25° C. is not restricted, but is preferably raw rubber like and specifically, at 25° C., the plasticity (plasticity over 3 minutes with a load of 1 kgf applied to a 4.2 g spherical sample in accordance with the method specified in JIS K 6249) is preferably in a range of 50 to 200, or in a range of 80 to 180.

The silicone composition (I) can be a simple mixture of components (a) and (b) or can contain partially crosslinked product of components (a) and (b). The mass ratio of components (a) and (b) in the silicone composition (I) is not restricted as long as the silicone layer (I) can be formed, but is preferably in a range of 1:2 to 19:1, in a range of 1:1 to 19:1, in a range of 2:1 to 9:1, or in a range of 2:1 to 8:2.

Note, examples of the method for partially cross-linking components (a) and (b) include a method of partial condensation reaction by heating these components and a partial condensation reaction of these components in the presence of a condensation reaction catalyst such as bases such as potassium hydroxide, barium hydroxide, or the like; aqueous ammonia; amines such as methylamine, ethylamine, propylamine, or the like; titanium compounds such as tetrabutyltitanate, tetraisobutyltitanate, or the like; tin compounds such as octyltin diacetate or the like; or hexamethyldisilazane or the like.

The silicone composition (I) can be made into the cross-linkable silicone composition (iii) by blending component (a) with (c) an organopolysiloxane having at least two alkenyl groups in a molecule, (d) an organohydrogenpolysiloxane having at least two silicon atom-bonded hydrogen atoms in a molecule, and (e) a hydrosilylation reaction catalyst.

Component (a) is as described above. Note, regarding the cross-linkable silicone composition (iii), use of a silicone resin with at least one alkenyl group or silicon atom-bonded hydrogen atom in a molecule as component (a) can contribute to the cross-link reaction.

Component (c) is an organopolysiloxane having at least two alkenyl groups in a molecule. The molecular structure of component (c) is not particularly restricted, and examples include a straight chain, straight chain with a branched part, branched chain, cyclic, and resin structures, and straight chain is preferable. Examples of the alkenyl groups in component (c) include alkenyl groups with 2 to 12 carbon atoms such as vinyl groups, allyl groups, butenyl groups, and pentenyl groups, and vinyl groups are preferable. The bond position of the alkenyl groups in component (c) is not restricted and can be bonded to the end of the molecule chain and/or to the silicon atom in the middle of the molecular chain. Furthermore, examples of groups other than alkenyl groups in the molecule that are bonded to the silicon atom in component (c) include: alkyl groups with 1 to 12 carbon atoms such as methyl groups, ethyl groups, propyl groups, butyl groups, pentyl groups, heptyl groups, or the like; aryl groups with 6 to 12 carbon atoms such as phenyl groups, tolyl groups, xylyl groups, or the like; aralkyl groups with 7 to 12 carbon atoms such as benzyl groups, phenethyl groups, or the like; halogen substituted alkyl groups with 1 to 12 carbon atoms such as chloromethyl groups, 3-chloropropyl groups, 3,3,3-trifluoropropyl groups, or the like, and methyl groups and phenyl groups are preferable.

Component (d) is an organohydrogenpolysiloxane having at least two silicon atom-bonded hydrogen atoms in a molecule. The molecular structure of component (d) is not restricted, and examples include straight chain, branched chain, cyclic, reticulated, and straight chain with a branched part. Straight chain is preferable. The bond position of the silicon atom-bonded hydrogen atoms in component (d) is not restricted and can be bonded to the end of the molecule chain and/or to the silicon atom in the middle of the molecular chain. Furthermore, examples of groups other than hydrogen atoms in the molecule that are bonded to the silicon atom in component (d) include: alkyl groups with 1 to 12 carbon atoms such as methyl groups, ethyl groups, propyl groups, butyl groups, pentyl groups, heptyl groups, or the like; aryl groups with 6 to 12 carbon atoms such as phenyl groups, tolyl groups, xylyl groups, naphthyl groups, or the like; aralkyl groups with 7 to 12 carbon atoms such as benzyl groups, phenethyl groups, or the like; halogen substituted alkyl groups with 1 to 12 carbon atoms such as chloromethyl groups, 3-chloropropyl groups, 3,3,3-trifluoropropyl groups, or the like, and methyl groups and phenyl groups are preferable. Furthermore, the viscosity of component (d) at 25° C. is not restricted, but is preferably in a range of 0.1 to 500,000 mPa·s, or in a range of 1 to 100,000 mPa·s.

Examples of the organohydrogenpolysiloxane of this type of component (d) include a methylhydrogenpolysiloxane endblocked at both molecular chain terminals with trimethylsiloxy groups, a copolymer of dimethylsiloxane and methylhydrogensiloxane endblocked at both molecular chain terminals with trimethylsiloxy groups, a copolymer of dimethylsiloxane, methylhydrogensiloxane and methylphenylsiloxane endblocked at both molecular chain terminals with trimethylsiloxy groups, a dimethylpolysiloxane endblocked at both molecular chain terminals with dimethylhydrogensiloxy groups, a copolymer of dimethylsiloxane and methylphenylsiloxane endblocked at both molecular chain terminals with dimethylhydrogensiloxy groups, a methylphenylpolysiloxane endblocked at both molecular chain terminals with dimethylhydrogensiloxy groups, an organopolysiloxane resin comprising: a siloxane unit represented by the formula: $R^1{}_3SiO_{1/2}$, a siloxane unit represented by the formula: $R^1HSiO_{2/2}$ and a siloxane unit represented by the formula: $SiO_{4/2}$, an organopolysiloxane resin comprising: a siloxane unit represented by the formula: $R^1{}_2HSiO_{1/2}$ and a siloxane unit represented by the formula: $SiO_{4/2}$, an organopolysiloxane resin comprising: a siloxane unit represented by the formula: $R^1HSiO_{2/2}$ and a siloxane unit represented by the formula: $R^1SiO_{3/2}$ or a siloxane unit represented by the formula: $HSiO_{3/2}$, or two or more of these organohydrogenpolysiloxanes mixed together. Note, $R^1$ in the formulas is a monovalent hydrocarbon group other than an alkenyl group and examples are the same monovalent hydrocarbon groups described above.

The content amount of component (d) is not restricted, but is preferably in an amount such that silicon atom-bonded hydrogen atom in this component is in a range of 0.5 to 50 moles, in a range of 0.6 to 30 moles, or in a range of 0.7 to 20 moles, with regards to 1 mole of total alkenyl groups in component (c). This is because, if the content amount of component (d) is above the lower limit of the range described above, curing of the silicone composition (iii) obtained progresses sufficiently. On the other hand, if the content amount is below the upper limit of the range described above, peel resistance of the silicone layer (I) obtained is smaller.

Component (e) is a hydrosilylation reaction catalyst for promoting cross-linking of the silicone composition (iii). Component (e) is preferably chloroplatinic acid, alcohol solutions of chloroplatinic acid, carbonyl complexes of platinum, alkenyl siloxane complexes of platinum, and olefin complexes of platinum. In particular, alkenyl siloxane complexes of platinum are preferable in that the compatibility with component (b) is favorable. Examples of alkenyl siloxanes in this alkenyl siloxane complex of platinum include 1,3-divinyltetramethyldisiloxane and 1,1,3,3-tetravinyldimethyldisiloxane.

The content amount of component (e) is not restricted as long as the curing reaction of the silicone composition (iii) advances. However, the platinum metal in this component relative to component (b) on a mass unit basis is preferably in a range of 0.1 to 1,000 ppm, and more preferably in a range of 1 to 500 ppm. This is because, if the content amount of component (c) is above the lower limit of the range described above, curing of the silicone composition (iii) obtained progresses sufficiently. On the other hand, if the content amount is below the upper limit of the range described above, coloring or the like issues of the silicone layer (I) obtained occur less readily.

The silicone composition (iii) can contain as other arbitrary components an inhibitor to control the curing reaction such as alkyne alcohols such as 2-methyl-3-butyn-2-ol, 3,5-dimethyl-1-hexyn-3-ol, 3-methyl-1-penten-3-ol, 2-phenyl-3-butyn-2-ol, or the like; enyne compounds such as 3-methyl-3-penten-1-yne, 3,5-dimethyl-3-hexen-1-yne, 2-isobutyl-1-buten-3-yne, and the like; alkenyl siloxanes such as 1,3,5,7-tetramethyl-1,3,5,7-tetravinylcyclotetrasiloxane, 1,3,5,7-tetramethyl-1,3,5,7-tetrahexenylcyclotetrasiloxane, or the like. Two or more types of these inhibitors can be used together. The content amount of the inhibitor is not restricted, but is preferably 5 mass parts or less relative to 100 mass parts of component (b).

In the step (1), examples of methods for applying the silicone composition (I) to one surface of the peelable substrate include well known coating methods such as gravure coat, offset gravure, roll coat, reverse roll coat, air knife coat, curtain coat, comma coat, slit die coat, or the like.

To improve the coatability of the silicone composition (I) an organic solvent such as toluene, xylene, hexane, heptane, isooctane, acetone, methyl ethyl ketone, methyl isobutyl ketone, ethyl acetate, or the like; a fluorine solvent such as US 3M Company product name Novec™7200 or the like; or an alkoxysilane compound such as tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltrimethoxysilane, allyltriethoxysilane, 3-glycidoxypropyltrimethoxysilane, 3-methacryloxypropyltrimethoxysilane, or the like may be mixed therein.

After the silicone composition (I) is coated, heating is performed as needed and if an organic solvent is used, this organic solvent is removed to form a silicone layer (I). If heated, the temperature is not restricted, but is preferably 50° C. or higher, in a range of 50 to 200° C., or in a range of 80 to 200° C.

The film thickness of the silicone layer (I) is not restricted, however, if too thick, reducing the modulus of the silicone-based adhesive becomes difficult, and therefore, the film thickness is preferably in a range of 5 to 200 μm, in a range of 5 to 100 μm, or in a range of 10 to 50 μm.

In the step (2), the silicone composition (II) is coated on the surface of the silicone layer (I) and the silicone-based adhesive is formed by curing the silicone composition (II).

The silicone composition (II) either does not contain the silicone resin or if contained, its content amount is lower than that in silicone composition (I).

This type of the silicone composition (II) preferably comprises: (c') an organopolysiloxane having at least two alkenyl groups in a molecule, (d') an organohydrogenpolysiloxane having at least two silicon atom-bonded hydrogen atoms in a molecule, and (e') a hydrosilylation reaction catalyst.

Component (c') is an organopolysiloxane having at least two alkenyl groups in a molecule. The molecular structure of component (c') is not particularly restricted, and examples include a straight chain, straight chain with a branched part, branched chain, cyclic, and resin structures, and straight chain is preferable. Examples of the alkenyl groups in component (c') include alkenyl groups with 2 to 12 carbon atoms such as vinyl groups, allyl groups, butenyl groups, and pentenyl groups, and vinyl groups are preferable. The bond position of the alkenyl groups in component (c') is not restricted and can be bonded to the end of the molecule chain and/or to the silicon atom in the middle of the molecular chain. Furthermore, examples of groups other than alkenyl groups in the molecule that are bonded to the silicon atom in component (c') include: alkyl groups with 1 to 12 carbon atoms such as methyl groups, ethyl groups, propyl groups, butyl groups, pentyl groups, heptyl groups, or the like; aryl groups with 6 to 12 carbon atoms such as phenyl groups, tolyl groups, xylyl groups, or the like; aralkyl groups with 7 to 12 carbon atoms such as benzyl groups, phenethyl groups, or the like; halogen substituted alkyl groups with 1 to 12 carbon atoms such as chloromethyl groups, 3-chloropropyl groups, 3,3,3-trifluoropropyl groups, or the like, and methyl groups and phenyl groups are preferable.

Component (d') is an organohydrogenpolysiloxane having at least two silicon atom-bonded hydrogen atoms in a molecule. The molecular structure of component (d') is not restricted, and examples include straight chain, branched chain, cyclic, reticulated, and straight chain with a branched part. Straight chain is preferable. The bond position of the silicon atom-bonded hydrogen atoms in component (d') is not restricted and can be bonded to the end of the molecule chain and/or to the silicon atom in the middle of the molecular chain. Furthermore, examples of groups other than hydrogen atoms in the molecule that are bonded to the silicon atom in component (d') include: alkyl groups with 1 to 12 carbon atoms such as methyl groups, ethyl groups, propyl groups, butyl groups, pentyl groups, heptyl groups, or the like; aryl groups with 6 to 12 carbon atoms such as phenyl groups, tolyl groups, xylyl groups, naphthyl groups, or the like; aralkyl groups with 7 to 12 carbon atoms such as benzyl groups, phenethyl groups, or the like; halogen substituted alkyl groups with 1 to 12 carbon atoms such as chloromethyl groups, 3-chloropropyl groups, 3,3,3-trifluoropropyl groups, or the like, and methyl groups and phenyl groups are preferable. Furthermore, the viscosity of component (d') at 25° C. is not restricted, but is preferably in a range of 0.1 to 500,000 mPa·s, or in a range of 1 to 100,000 mPa·s.

Examples of component (d') include the same organohydrogenpolysiloxanes as for component (d).

The content amount of component (d') is not restricted, but is preferably in an amount such that silicon atom-bonded hydrogen atoms in this component in a range of 0.5 to 50 moles, in a range of 0.6 to 30 moles, or in a range of 0.7 to 20 moles, with regards to 1 mole of total alkenyl groups in component (c'). This is because, if the content amount of component (d') is above the lower limit of the range described above, curing of the silicone composition (II) obtained progresses sufficiently. On the other hand, if the content amount is below the upper limit of the range described above, adhesive force of the silicone-based adhesive obtained is smaller.

Component (e') is a hydrosilylation reaction catalyst for promoting the curing reaction of the silicone composition (II). Examples of component (e') include the same hydrosilylation reaction catalysts for component (e).

The content amount of component (e') is not restricted as long as the curing reaction of the silicone composition (II) advances. However, the platinum metal in this component relative to component (b') on a mass unit basis is preferably in a range of 0.1 to 1,000 ppm, more preferably in a range of 1 to 500 ppm. This is because, if the content amount of component (e') is above the lower limit of the range described above, curing of the silicone composition (II) obtained progresses sufficiently. On the other hand, if the content amount is below the upper limit of the range described above, coloring or the like issues of the silicone-based adhesive obtained occur less readily.

The silicone composition (II) can contain an inhibitor as another arbitrary component as described previously to control the curing reaction. The content amount of the inhibitor is not restricted but is preferably 5 mass parts or less relative to 100 mass parts of component (b').

In the step (2), examples of methods for applying the silicone composition (II) include well known coating methods such as gravure coat, offset gravure, roll coat, reverse roll coat, air knife coat, curtain coat, comma coat, or the like.

An organic solvent, fluorine solvent, or alkoxysilane compound can be blended in to improve coat-ability of the silicone composition (II).

In the step (2), the coating thickness of the silicone composition (II) is not restricted, however, a thickness enabling the thickness of the silicone-based adhesive obtained to be within a range of 10 to 300 μm, within a range of 20 to 200 μm, or within a range of 20 to 100 μm is preferable.

In the step (2), for example:
(i) curing the silicone composition (II) after transferring a part of the silicone resin from the silicone layer (I) into the layer of the silicone composition (II);
(ii) curing the layer of the silicone composition (II) while transferring a part of the silicone resin from the silicone layer (I) to the silicone composition (II);
(iii) after curing the silicone composition (II), transferring a part of the silicone resin from the silicone layer (I) to the cured product of the silicone composition (II); or any of the combinations of (i) to (iii) described above,
the silicone (I) functions as a composite silicone-based adhesive and even though the modulus can be reduced, the peel force from the peelable substrate can be minimized.

In addition, if an organic solvent is used in the step (2) when applying the silicone composition (II), the silicone-based adhesive can be formed by removing the organic solvent and heating as necessary to cure the silicone composition (II). If heated, the temperature is not restricted, but is preferably 50° C. or higher, in a range of 50 to 200° C., or in a range of 80 to 200° C.

With the producing method of the present invention the shear storage modulus at 25° C. of the silicone formed by curing or drying the silicone composition (I) is preferably higher than the shear storage modulus at 25° C. of silicone cured product obtained by curing only the silicone composition (II). Specifically, the shear storage modulus at 25° C. of the silicon formed by curing or drying the silicone composition (I) is preferably 10 MPa or higher, 5 MPa or higher, 1 MPa or higher, 0.7 MPa or higher, 0.6 MPa or higher, 0.5 MPa or higher, or 0.4 MPa or higher, while on the other hand, the shear storage modulus at 25° C. of the silicon cured product obtained by curing only the silicone composition (II) is preferably less than 0.7 MPa, less than 0.6 MPa, less than 0.5 MPa, less than 0.4 MPa, less than 0.3 MPa, less than 0.2 MPa, or less than 0.1 MPa.

The glass transition point (Tg) of the silicone formed by curing or drying the silicone composition (I) is preferably higher than the glass transition point (Tg) of the silicon cured product obtained by curing only the silicone composition (II). This glass transition point (Tg) is determined through, for example, Differential Scanning Calorimeter (DSC) or an elasticity test. Specifically, in the elasticity test, the glass transition point (Tg) is the temperature that shows a loss tangent (tanδ) peak obtained from [shear loss modulus/shear storage modulus].

Furthermore, with the method of the present invention, the following step (3) may be performed after the step (2).
Step (3): adhering a substrate to the surface of the silicone-based adhesive.

The substrate used in the step (3) is not restricted and examples include films such as polyethylene, polypropylene, polystyrene, polyvinyl chloride, polycarbonate, polyethylene terephthalate (PET), nylon, or the like; films surface-treated with a fluorosilicone, such as polyethylene, polypropylene, polystyrene, polyvinyl chloride, polycarbonate, polyethylene terephthalate (PET), nylon, thermoplastic polyurethane, or the like; a fluorine-based resin film of polytetrafluoroethylene or the like; and films coated with a fluorine-based resin such as polytetrafluoroethylene or the like, such as polyethylene, polypropylene, polystyrene, polyvinyl chloride, polycarbonate, polyethylene terephthalate, nylon, thermoplastic polyurethane, or the like. Through use of this substrate as the peelable substrate used in the step (1), it can be adhered to both surfaces of the silicone-based adhesive obtained. Note, this peelable substrate also functions as a peelable protective film preventing adherence of dust on the surface of the silicone-based adhesives during storage.

Furthermore, with the method of the present invention, similar to the step (1), a silicone composition (I) can be applied to the surface of the silicone-based adhesive between the step (2) and the step (3), and the silicone layer (I) can be formed by curing or drying the silicone composition (I). Note, the silicone composition (I) used in this step is the same as that described above and can be the same one as that used in the step (I) or a different one can be used.

EXAMPLES

The method of the present invention for producing a silicone-based adhesive is described in detail with the following Examples. Note, in the embodiments, viscosity is the value at 25° C. and plasticity is the value based on the method specified in JIS K 6249 at 25° C. with a 1 kgf load applied for 3 minutes to a 4.2 g spherical test piece.

Preparation of a Peelable Film

Fluorosilicone (mixture of Dow Corning Co., Ltd. Q2-7785 RELEASE COATING and Q2-7560 CROSS LINKER) was coated on one surface of a 50 μm thick PET film at a volume such that the coating amount was 0.5 g/m² after curing. Thereafter curing was performed for 2 minutes in a 150° C. oven to prepare the peelable film.

Viscoelasticity Test

Several sheets of silicone-based adhesives were adhered together to prepare a test sample with a thickness of 1 mm. The test sample was cut into a circle with a diameter of 8 mm, adhered to the parallel plate probe of a dynamic viscoelastic device (Anoton Paar product MCR302) and the viscoelasticity of the test sample was measured at a frequency of 1 Hz, shear strain of 0.1%, and heating rate of 3° C./min. between prescribed temperatures.

Practical Example 1

25 mass parts of a dimethylpolysiloxane endblocked at both molecular chain terminals with dimethylhydroxysiloxy groups and having a plasticity of 145; 46 mass parts of a xylene solution (solids content=66 mass %) of a silicone resin that contains 3 mass % of a silicon atom-bonded hydroxyl group, and that consists of a siloxane unit represented by the formula: $(CH_3)_3SiO_{1/2}$ and a siloxane unit represented by the formula: $SiO_{4/2}$, where the mole ratio of the siloxane unit represented by the formula: $(CH_3)_3SiO_{1/2}$ to the siloxane unit represented by the formula: $SiO_{4/2}$ is 0.9; and 29 mass parts of xylene were mixed at 150° C. for 3 hours. Thereafter, this was cooled to room temperature and 200 mass parts of a xylene solution (solids content=64 mass %) of a silicone resin that contains 1 mass % of a silicon atom-bonded hydroxyl group, and that consists of a siloxane unit represented by the formula: $(CH_3)_3SiO_{1/2}$ and a siloxane unit represented by the formula: $SiO_{4/2}$, where the mole ratio of the siloxane unit represented by the formula: $(CH_3)_3SiO_{1/2}$ to the siloxane unit represented by the formula: $SiO_{4/2}$ is 0.9; and isooctane was added to provide a coating liquid (A1) with 35 mass % solids content. Note, the silicone resin content of the silicone composition in this coating liquid (A1) was 89 mass %.

This coating liquid (A1) was dried for 1 hour at 120° C. Thereafter it was gradually cooled over 3 hours to below 50° C. to prepare a test sample with a thickness of 1 mm. A viscoelasticity test was performed from 0° C. to 195° C. on this test sample. The shear storage modulus at 25° C. of this test body was 51 MPa, the shear storage modulus at 0° C. was 95 MPa, and the glass transition point was found to be 195° C.

The coating liquid (A1) was coated on the peelable film using a #8 Mayer bar and cured in a 120° C. oven for 2 minutes to manufacture a peelable film containing a silicone layer. The thickness of the silicone layer was 3 μm.

A coating liquid (B1) was prepared by mixing 46 mass parts of a dimethylpolysiloxane endblocked at both molecular chain terminals with dimethylhydroxysiloxy groups and having a plasticity of 135, 101 mass parts of a xylene solution (solids content=64 mass %) of a silicone resin that contains 1 mass % of a silicon atom-bonded hydroxyl group, and that consists of a siloxane unit represented by the formula: $(CH_3)_3SiO_{1/2}$ and a siloxane unit represented by the formula: $SiO_{4/2}$, where the mole ratio of the siloxane unit represented by the formula: $(CH_3)_3SiO_{1/2}$ to the siloxane unit represented by the formula: $SiO_{4/2}$ is 0.9, 0.4 mass parts of a methylhydrogenpolysiloxane endblocked at both molecular chain terminals with trimethylsiloxy groups and having a viscosity of 20 mPa·s (an amount where the mole ratio of the silicon atom-bonded hydrogen atoms in this component compared to the vinyl group in the dimethylpolysiloxane above is 19), 75 mass parts of toluene, 0.4 mass parts of a mixture of 3,5-dimethyl-3-hexen-1-yne and 2-isobutyl-1-buten-3-yne, and 1.2 mass parts of a platinum based catalyst (SRX 212 CATALYST by Dow Corning Toray Co., Ltd.) at room temperature. Note, the silicone resin content of the silicone composition in this coating liquid (B1) was 58 mass %.

A test sample was prepared by curing this coating liquid (B1) in a 120° C. oven for 2 minutes. A viscoelasticity test was performed from –70° C. to 150° C. on this test sample. The shear storage modulus at 25° C. of this test sample was 0.2 MPa, the shear storage modulus at 0° C. was 0.8 MPa, the shear storage modulus at –20° C. was 3.0 MPa, and the glass transition point was found to be 17° C.

The coating liquid (B1) was coated on the silicone layer of a peelable film that has a silicone layer using a baker type film applicator and cured in a 120° C. oven for 3 minutes to manufacture a silicone-based adhesive. Next, peelable films were adhered to the surface of this silicone-based adhesive to manufacture a double-sided adhesive with peelable film.

A test sample was prepared by peeling the peelable film from the double-sided adhesive with peelable film and pasting together several double-sided adhesives. A viscoelasticity test was performed from –70° C. to 165° C. on this test sample, and the results are recorded in Table 1. It was found that this test body had high flexibility at room temperature and at low temperature.

Peel Resistance Test

A test sample was prepared with a non-processed 50 μm thick PET film adhered to the surface of a silicone-based adhesive prepared in this manner in place of the peelable film. This test sample was stored for 1 day at 70° C., cooled to room temperature, and then cut into thin strips with a width of 2 cm. A 180 degree peel resistance test was performed on this test sample using a tension at 25° C. and a peel speed of 1 m/min. The results are recorded in Table 1.

Adhesiveness Test

Next, the test sample used in the peel resistance test described above was adhered to a 2 mm thick acrylic plate and pressed 2 times back-and-forth using a 2 kg rubber roller. After allowing to rest at room temperature for 1 hour, a 180 degree adhesion test was performed on this test sample at 25° C. and a peel speed of 0.3 m/min. The results are recorded in Table 1.

Comparative Example 1

The coating liquid (A1) prepared in Practical Example 1 was coated on the peelable film using a baker type film applicator, and dried in a 120° C. oven for 2 minutes, to provide a silicone-based adhesive with a thickness of 50 μm. Similar to Practical Example 1, a peel resistance test and adhesive test were performed on this silicone-based adhesive, however, adhesiveness was too low and a valid value could not be obtained. In addition, a viscoelasticity test from –70° C. to 150° C. was performed on this silicone-based adhesive, and the results are recorded in Table 1.

Comparative Example 2

The coating liquid (B1) prepared in Practical Example 1 was coated on the peelable film using a baker type film applicator and cured in a 120° C. oven for 2 minutes to provide a silicone-based adhesive with a thickness of 50 μm. A peel resistance test and adhesiveness test were performed on this silicone-based adhesive in the same manner as Practical Example 1, however, a zipping phenomenon occurred in the peel resistance test, and a stable peel resistance could not be obtained. In addition, a viscoelasticity test from –70° C. to 150° C. was performed on this silicone-based adhesive, and the results are recorded in Table 1.

TABLE 1

| | | Present Invention | Comparative Example | |
| --- | --- | --- | --- | --- |
| | | Prac. Exam. 1 | Comp. Exam. 1 | Comp. Exam. 2 |
| Silicone-based adhesive | Thickness (μm) | 50 | 50 | 50 |
| | Peel resistance (gf/2 cm) | 7 | 5 | >100 (zipping occurred) |
| | Adhesiveness (Kgf/2 cm) | 1.0 | <0.01 | 0.9 |
| Shear storage modulus (MPa) | 25° C. | 0.2 | 51 | 0.2 |
| | 0° C. | 0.9 | 95 | 0.8 |
| | –20° C. | 3.5 | — | 3.0 |

Practical Example 2

A coating liquid (A2) was prepared by mixing 30 mass parts of a dimethylpolysiloxane endblocked at both molecular chain terminals with dimethylhydroxysiloxy groups and having a plasticity of 135, 88 mass parts of a xylene solution (solids content=64 mass %) of a silicone resin that contains 1 mass % of a silicon atom-bonded hydroxyl group, and that consists of a siloxane unit represented by the formula:

(CH₃)₃SiO_{1/2} and a siloxane unit represented by the formula: SiO_{4/2}, where the mole ratio of the siloxane unit represented by the formula: (CH₃)₃SiO_{1/2} to the siloxane unit represented by the formula: SiO_{4/2} is 0.9, 0.3 mass parts of a methylhydrogenpolysiloxane endblocked at both molecular chain terminals with trimethylsiloxy groups and having a viscosity of 20 mPa·s (an amount where the mole ratio of the silicon atom-bonded hydrogen atoms in this component compared to the vinyl group in the dimethylpolysiloxane above is 22), 0.3 mass parts of a mixture of 3,5-dimethyl-3-hexen-1-yne and 2-isobutyl-1-buten-3-yne, 91 mass parts of toluene, and 0.9 mass parts of a platinum based catalyst (SRX 212 CATALYST by Dow Corning Toray Co., Ltd.) at room temperature. The silicone resin content of the silicone composition in this coating liquid (A2) was 65 mass %.

A test sample was manufactured by curing this coating liquid (A2) in a 150° C. oven for 3 minutes. A viscoelasticity test was performed from −70° C. to 200° C. on this test sample. The shear storage modulus at 25° C. of this test sample was 2.0 MPa, the shear storage modulus at 0° C. was 9.1 MPa, the shear storage modulus at −20° C. was 21 MPa, and the glass transition point was found to be 60° C.

The coating liquid (A2) was coated on the peelable film using a baker type film applicator and cured in a 150° C. oven for 3 minutes to manufacture a peelable film containing a silicone layer with a thickness of 35 μm.

A coating liquid (B2) was prepared by mixing 60 mass parts of a dimethylpolysiloxane endblocked at both molecular chain terminals with dimethylhydroxysiloxy groups and having a plasticity of 135, 100 mass parts of a xylene solution (solids content=64 mass %) of a silicone resin that contains 1 mass % of a silicon atom-bonded hydroxyl group, and that consists of a siloxane unit represented by the formula: (CH₃)₃SiO_{1/2} and a siloxane unit represented by the formula: SiO_{4/2}, where the mole ratio of the siloxane unit represented by the formula: (CH₃)₃SiO_{1/2} to the siloxane unit represented by the formula: SiO_{4/2} is 0.9, 0.4 mass parts of a methylhydrogenpolysiloxane endblocked at both molecular chain terminals with trimethylsiloxy groups and having a viscosity of 20 mPa·s (an amount where the mole ratio of the silicon atom-bonded hydrogen atoms in this component compared to the vinyl group in the dimethylpolysiloxane above is 16), 0.4 mass parts of a mixture of 3,5-dimethyl-3-hexen-1-yne and 2-isobutyl-1-buten-3-yne, 141 mass parts of toluene, and 1.3 mass parts of a platinum based catalyst (SRX 212 CATALYST by Dow Corning Toray Co., Ltd.) at room temperature. The silicone resin content of the silicone composition in this coating liquid (B2) was 51 mass %.

A test sample was manufactured by curing this coating liquid (B2) in a 150° C. oven for 3 minutes. A viscoelasticity test was performed from −70° C. to 165° C. on this test sample. The shear storage modulus at 25° C. of this test sample was 0.1 MPa, the shear storage modulus at 0° C. was 0.1 MPa, the shear storage modulus at −20° C. was 0.3 MPa, and the glass transition point was found to be −25° C.

The coating liquid (B2) was coated on the silicone layer of a peelable film that has a silicone layer using a baker type film applicator and cured in a 150° C. oven for 3 minutes to manufacture a silicone-based adhesive. The thickness of the silicone-based adhesive was 70 μm. Next, peelable films were adhered to the surface of this silicone-based adhesive to manufacture a double-sided adhesive with peelable film.

A test sample was prepared by peeling the peelable film from the double-sided adhesive with peelable film and pasting together several double-sided adhesives. A viscoelasticity test was performed from −70° C. to 165° C. on this test sample, and the results are recorded in Table 2. It was found that this test body had high flexibility at room temperature and at low temperature.

Peel Resistance Test

After storing the double-sided adhesive with peelable film at 70° C. for 2 days and cooling to room temperature, a 2 cm wide strip was cut, and only the peelable film attached after curing was peeled off. Next, a 2 mm acrylic plate (Mitsubishi Rayon model Arylite (TM) L001) was attached to the adhesive surface of the double-sided adhesive where the peelable film was not peeled off, and was pressed back-and-forth 2 times using a 2 kg rubber roller. Afterwards, a 180 degree peel resistance test was performed on the remaining peelable film at 25° C. at a speed of 1 m/minute to measure the peel resistance. The results are shown in Table 2.

Practical Example 3

A coating liquid (A3) was prepared by mixing 30 mass parts of a dimethylpolysiloxane endblocked at both molecular chain terminals with dimethylvinylsiloxy groups and having a plasticity of 135, 131 mass parts of a xylene solution (solids content=64 mass %) of a silicone resin that contains 1 mass % of a silicon atom-bonded hydroxyl group, and that consists of a siloxane unit represented by the formula: (CH₃)₃SiO_{1/2} and a siloxane unit represented by the formula: SiO_{4/2}, where the mole ratio of the siloxane unit represented by the formula: (CH₃)₃SiO_{1/2} to the siloxane unit represented by the formula: SiO_{4/2} is 0.9, 0.3 mass parts of a methylhydrogenpolysiloxane endblocked at both molecular chain terminals with trimethylsiloxy groups and having a viscosity of 20 mPa·s (an amount where the mole ratio of the silicon atom-bonded hydrogen atoms in this component compared to the vinyl group in the dimethylpolysiloxane above is 22), 0.3 mass parts of a mixture of 3,5-dimethyl-3-hexen-1-yne and 2-isobutyl-1-buten-3-yne, 21 mass parts of toluene, and 0.9 mass parts of a platinum based catalyst (SRX 212 CATALYST by Dow Corning Toray Co., Ltd.) at room temperature. The silicone resin content of the silicone composition in this coating liquid (A3) was 73 mass %.

A test sample was manufactured by curing this coating liquid (A3) in a 150° C. oven for 3 minutes. A viscoelasticity test was performed from −50° C. to 210° C. on this test sample. The shear storage modulus at 25° C. of this test sample was 15 MPa, the shear storage modulus at 0° C. was 27 MPa, the shear storage modulus at −20° C. was 39 MPa, and the glass transition point was found to be 122° C.

The coating liquid (A3) was coated on the peelable film using a baker type film applicator and cured in a 150° C. oven for 3 minutes to manufacture a peelable film containing a silicone layer with a thickness of 35 μm.

The coating liquid (B2) manufactured in Practical Example 2 was coated on the silicone layer of a peelable film that has a silicone layer using a baker type film applicator and cured in a 150° C. oven for 3 minutes to manufacture a silicone-based adhesive. The thickness of the silicone-based adhesive was 70 μm. Next, peelable films were adhered to the surface of this silicone-based adhesive to manufacture a double-sided adhesive with peelable film.

A test sample was prepared by peeling the peelable film from the double-sided adhesive with peelable film and applying together several double-sided adhesives. A viscoelasticity test was performed from −70° C. to 165° C. on this test sample, and the results are recorded in Table 2. It was found that this test body had high flexibility at room temperature and at low temperature.

In addition, the peel resistance of this double-sided adhesive with peelable film was measured in the same manner as in Practical Example 2. The results are recorded in Table 2.

Comparative Example 3

The coating liquid (A2) manufactured in Practical Example 2 was coated on the peelable film using a baker type film applicator and dried in a 150° C. oven for 3 minutes to manufacture a silicone-based adhesive with a silicone layer having a thickness of 67 μm. The peel resistance of this silicone-based adhesive was measured in the same manner as in Practical Example 2. The results are recorded in Table 2. In addition, a viscoelasticity test was performed from −50° C. to 210° C. on this silicone-based adhesive, and the results are recorded in Table 2.

Comparative Example 4

The coating liquid (B2) manufactured in Practical Example 2 was coated on the peelable film using a baker type film applicator and dried in a 150° C. oven for 3 minutes to manufacture a silicone-based adhesive with a silicone layer having a thickness of 53 μm. The peel resistance of this silicone-based adhesive was measured in the same manner as Practical Example 2, however, a zipping phenomenon occurred, and a stable peel resistance could not be obtained. In addition, a viscoelasticity test was performed from −50° C. to 210° C. on this silicone-based adhesive, and the results are recorded in Table 2.

Comparative Example 5

The coating liquid (A3) manufactured in Practical Example 3 was coated on the peelable film using a baker type film applicator and dried in a 150° C. oven for 3 minutes to manufacture a silicone-based adhesive with a silicone layer having a thickness of 61 μm. The separation resistance of this silicone-based adhesive was measured in the same manner as in Practical Example 3. The results are recorded in Table 2. In addition, a viscoelasticity test was performed from −50° C. to 210° C. on this silicone-based adhesive, and the results are recorded in Table 2.

Comparative Example 6

The coating liquid (A2) and the coating liquid (B2) manufactured in Practical Example 2 were mixed with a mass ratio of 1:1 to manufacture a coating liquid (C1). This coating liquid (C1) was coated on the peelable film using a baker type film applicator and dried in a 150° C. oven for 3 minutes to manufacture a silicone-based adhesive with a silicone layer having a thickness of 70 μm. The peel resistance of this silicone-based adhesive was measured in the same manner as Practical Example 2, however, a zipping phenomenon occurred, and a stable peel resistance could not be obtained. In addition, a viscoelasticity test was performed from −70° C. to 210° C. on this silicone-based adhesive, and the results are recorded in Table 2.

TABLE 2

| | | | Present Invention | | Comparative Example | | | |
| --- | --- | --- | --- | --- | --- | --- | --- | --- |
| | | | Prac. Exam. 2 | Prac. Exam. 3 | Comp. Exam. 3 | Comp. Exam. 4 | Comp. Exam. 5 | Comp. Exam. 6 |
| Silicone-based adhesive | Thickness (μm) | | 70 | 37 | 67 | 53 | 61 | 70 |
| | Peel resistance (gf/2 cm) | | 9 | 3 | 4 | >100 (zipping occurred) | 2 | >100 (zipping occurred) |
| | Shear storage modulus (MPa) | 25° C. | 0.2 | 0.3 | 2.0 | 0.1 | 15 | 0.2 |
| | | 0° C. | 0.4 | 0.6 | 9.1 | 0.1 | 27 | 0.8 |
| | | −20° C. | 1.3 | 1.5 | 21 | 0.3 | 39 | 3.0 |

Practical Example 4

The coating liquid (A2) manufactured in Practical Example 2 was coated on the peelable film using a baker type film applicator and cured in a 150° C. oven for 3 minutes to manufacture a peelable film containing a silicone layer with a thickness of 45 μm.

Next, the coating liquid (B2) manufactured in Practical Example 2 was coated on the silicone layer of a peelable film that has a silicone layer and cured in a 150° C. oven for 3 minutes to manufacture a silicone-based adhesive. The thickness of the silicone-based adhesive was 152 μm.

Next, the coating liquid (A2) manufactured in Practical Example 2 was used to coat the silicone layer and cured in a 150° C. oven for 3 minutes to manufacture a silicone-based adhesive. The thickness of the silicone-based adhesive was 232 μm. Next, peelable films were adhered to the surface of this silicone-based adhesive to manufacture a double-sided adhesive with peelable film.

A test sample was prepared by peeling the peelable film from the double-sided adhesive with peelable film and pasting together several double-sided adhesives. A viscoelasticity test was performed from −70° C. to 165° C. on this test sample, and the results are recorded in Table 3. It was found that this test body had high flexibility at room temperature and at low temperature.

In addition, the peel resistance of this double-sided adhesive with peelable film was measured in the same manner as in Practical Example 2. The results are recorded in Table 3.

TABLE 3

| | | | Present Invention Prac. Exam. 4 |
| --- | --- | --- | --- |
| Silicone-based adhesive | Thickness (μm) | | 232 |
| | Peel resistance (gf/2 cm) | | 8 |
| | Shear storage modulus (MPa) | 25° C. | 0.2 |
| | | 0° C. | 0.4 |
| | | −20° C. | 1.3 |

INDUSTRIAL APPLICABILITY

As the silicone-based adhesive produced using the present method has low peel resistance from a peelable substrate regardless of having a low modulus, it can suitably be used as an adhesive where flexibility is required such as for flexible displays and the like.

REFERENCE NUMERALS

1. Peelable substrate
2. Silicone layer (I)
3. Layer of a silicone composition (II)
4. Silicone-based adhesive
5. Substrate

The invention claimed is:

1. A method for producing a silicone-based adhesive, the method comprising:
   (1) applying a silicone composition (I) to one surface of a peelable substrate, and then forming a silicone layer (I) by curing or drying the silicone composition (I), said silicone composition (I) comprising (a) a silicone resin comprising a siloxane unit represented by the formula $R_3SiO_{1/2}$ where each R represents the same or different monovalent hydrocarbon group with 1 to 12 carbon atoms, and a siloxane unit represented by the formula $SiO_{4/2}$; and
   (2) applying a silicone composition (II) to a surface of the silicone layer (I), and then forming the silicone-based adhesive by curing the silicone composition (II), said silicone composition (II) comprising:
      (c') an organopolysiloxane having at least two alkenyl groups in a molecule;
      (d') an organohydrogenpolysiloxane having at least two silicon atom-bonded hydrogen atoms in a molecule; and
      (e') a hydrosilylation reaction catalyst;
      wherein the silicone composition (II) either does not contain the silicone resin or if contained, its content amount is less than that in the silicone composition (I), and
      wherein step (2) further comprises:
         (i) curing the silicone composition (II) after transferring a part of the silicone resin from the silicone layer (I) into the layer of the silicone composition (II);
         (ii) curing the layer of the silicone composition (II) while transferring a part of the silicone resin from the silicone layer (I) to the silicone composition (II);
         (iii) after curing the silicone composition (II), transferring a part of the silicone resin from the silicone layer (I) to the cured product of the silicone composition (II); or
         any of the combinations of (i) to (iii) described above.

2. The method according to claim 1, wherein the silicone composition (I) is at least one type selected from a group consisting of (i) to (iii) below:
   (i) a silicone composition comprising: (a) the silicone resin; and (b) a diorganopolysiloxane;
   (ii) a silicone composition comprising: component (a) above; component (b) above; and a partially cross-linked material of components (a) and (b) above;
   (iii) a silicone composition comprising: component (a) above; (c) an organopolysiloxane having at least two alkenyl groups in a molecule; (d) an organohydrogenpolysiloxane having at least two silicon atom-bonded hydrogen atoms in a molecule; and (e) a hydrosilylation reaction catalyst.

3. The method according to claim 1, wherein the silicone composition (I) contains at least 50 mass % of (a) the silicone resin, and wherein the silicone composition (II) either does not contain component (a) above, or if contained, a content amount thereof is lower than that in the silicone composition (I).

4. The method according to claim 1, wherein a shear storage modulus at 25° C. of a silicone formed by curing or drying the silicone composition (I) is larger than a shear storage modulus at 25° C. of a silicone cured product obtained by curing only the silicone composition (II).

5. The method according to claim 1, further comprising:
   (3) adhering a substrate to a surface of the silicone-based adhesive.

6. The method according to claim 5, wherein the substrate is a peelable substrate.

7. The method according to claim 2, wherein the silicone composition (I) contains at least 50 mass % of component (a) above, and wherein the silicone composition (II) either does not contain component (a) above, or if contained, a content amount thereof is lower than that in the silicone composition (I).

8. The method according to claim 1, wherein the silicone layer (I) has a thickness of from 20 to 200 μm.

9. The method according to claim 1, wherein the silicone layer (I) has a thickness of from 20 to 100 μm.

10. The method according to claim 1, wherein the shear storage modulus at 25° C. of the silicon formed by curing or drying the silicone composition (I) is 0.7 MPa or higher and the shear storage modulus at 25° C. of the silicon cured product obtained by curing only the silicone composition (II) is less than 0.7 MPa.

11. The method according to claim 1, wherein the shear storage modulus at 25° C. of the silicon formed by curing or drying the silicone composition (I) is 1 MPa or higher and the shear storage modulus at 25° C. of the silicon cured product obtained by curing only the silicone composition (II) is less than 0.3 MPa.

12. The method according to claim 1, wherein the glass transition point (Tg) of the silicone formed by curing or drying the silicone composition (I) is higher than the glass transition point (Tg) of the silicon cured product obtained by curing only the silicone composition (II).

13. The method according to claim 6, wherein the substrate is further defined as a film comprising polyethylene, polypropylene, polystyrene, polyvinyl chloride, polycarbonate, polyethylene terephthalate (PET), or nylon.

14. The method according to claim 6, wherein the substrate is further defined as a film surface-treated with a fluorosilicone or a fluorine-based resin.

15. The method according to claim 1, further comprising adhering a first peelable substrate to a first surface of the silicone-based adhesive and a second peelable substrate to a second surface of the silicone-based adhesive.

16. The method according to claim 6, wherein the peelable substrate does not zip upon removal from the silicone-based adhesive after storage for 2 days at 70° C.

* * * * *